(12) United States Patent
Totsuka (10) Patent No.: US 9,001,328 B2
(45) Date of Patent: Apr. 7, 2015

(54) COLOR PROCESSING APPARATUS AND METHOD THEREOF

(75) Inventor: Atsushi Totsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 13/175,638

(22) Filed: Jul. 1, 2011

(65) Prior Publication Data

US 2012/0044497 A1    Feb. 23, 2012

(30) Foreign Application Priority Data

Aug. 23, 2010    (JP) .................... 2010-186539

(51) Int. Cl.
*G01J 3/46*    (2006.01)
*G01N 21/25*    (2006.01)
*G01J 3/10*    (2006.01)

(52) U.S. Cl.
CPC ... *G01J 3/10* (2013.01); *G01J 3/465* (2013.01)

(58) Field of Classification Search
None
See application file for complete search history.

(56) References Cited

U.S. PATENT DOCUMENTS

| 5,636,015 A * | 6/1997 | Imura et al. ................ 356/72 |
| 6,278,521 B1 * | 8/2001 | Jablonski et al. ............ 356/402 |
| 2006/0227319 A1 | 10/2006 | Imura ...................... 356/256 |

FOREIGN PATENT DOCUMENTS

JP    2006-292510    10/2006

OTHER PUBLICATIONS

Mahnax Mohammadi, "Developing and Imaging Bi-Spectrometer for Fluorescent Materials" Feb. 23, 2009. http://www.cis.rit.edu/DocumentLibrary/admin/uploads/CIS000111.pdf.*

* cited by examiner

*Primary Examiner* — Kara E Geisel
*Assistant Examiner* — Hina F Ayub
(74) *Attorney, Agent, or Firm* — Fitzpatrick, Cella, Harper & Scinto (57) ABSTRACT

A sample information input unit obtains spectral reflectances of color patches formed on a medium from a measuring device or storage unit. A media characteristic input unit inputs bi-spectral radiance factors of the medium from the storage unit. A computing unit computes bi-spectral radiance factors of the color patches based on the spectral reflectances of the color patches obtained by the sample information input unit and the bi-spectral radiance factors of the medium input by the media characteristic input unit.

6 Claims, 13 Drawing Sheets

| WAVELENGTH (nm) | SPECTRAL RADIANCE (cd / m$^2$) |
| --- | --- |
| 300 | xxx |
| 310 | xxx |
| 320 | xxx |
| ⋮ | ⋮ |
| 780 | xxx |

F I G. 10

| INCIDENT WAVELENGTH (nm) \ MEASUREMENT WAVELENGTH (nm) | 300 | 310 | 320 | ⋯ | 780 |
| --- | --- | --- | --- | --- | --- |
| 300 | xxx | xxx | xxx | ⋯ | xxx |
| 310 | xxx | xxx | xxx | ⋯ | xxx |
| 320 | xxx | xxx | xxx | ⋯ | xxx |
| ⋮ | | | | | |
| 780 | xxx | xxx | xxx | ⋯ | xxx |

| WAVELENGTH (nm) | REFLECTANCE | MEASUREMENT CONDITION |
|---|---|---|
| 300 | xxx | |
| 310 | xxx | |
| 320 | xxx | UV NON-CUTOFF |
| . | . | |
| . | . | |
| 370 | . | |
| 380 | . | |
| 390 | . | |
| . | . | |
| . | . | |
| . | . | UV CUTOFF |
| . | . | |
| . | . | |
| . | . | |
| 780 | xxx | |

COLOR PROCESSING APPARATUS AND METHOD THEREOF

BACKGROUND OF THE INVENTION

1. Field of the Invention

The present invention relates to color processing which takes a fluorescent material contained in a medium into consideration.

2. Description of the Related Art

Color matching processing used to match reproduction colors in an image input device, image display device, and image output device associates the reproduction colors among the respective devices in consideration of color reproduction characteristics of a matching target device.

Figure 1:
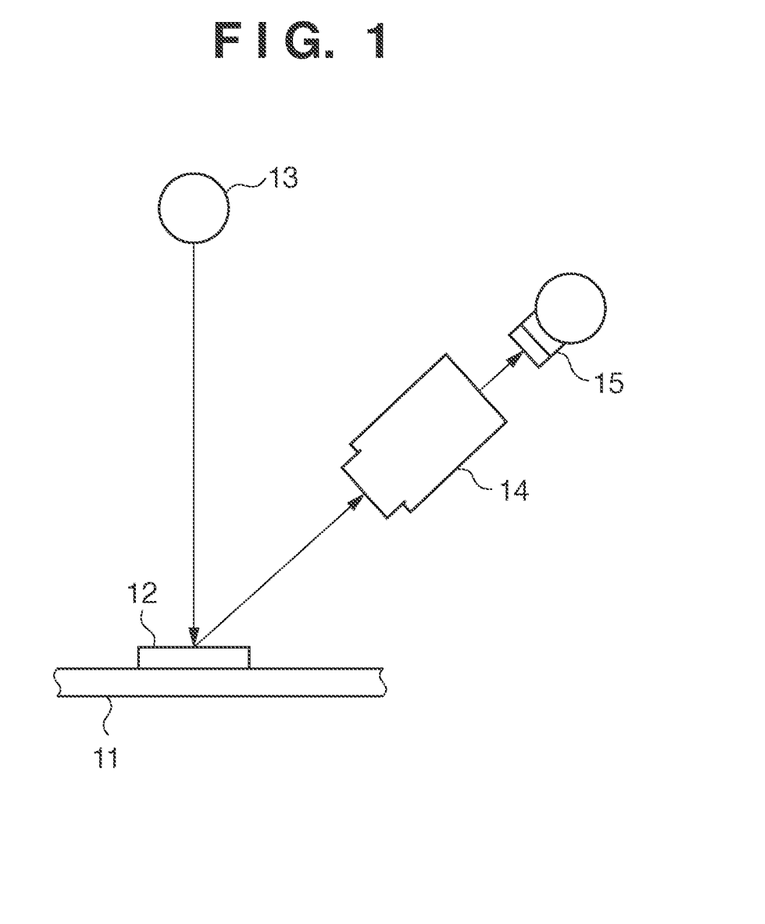
FIGS. 1 and 2 are views for explaining the sequence for obtaining color reproduction characteristics of an image output device.
Figure 2:
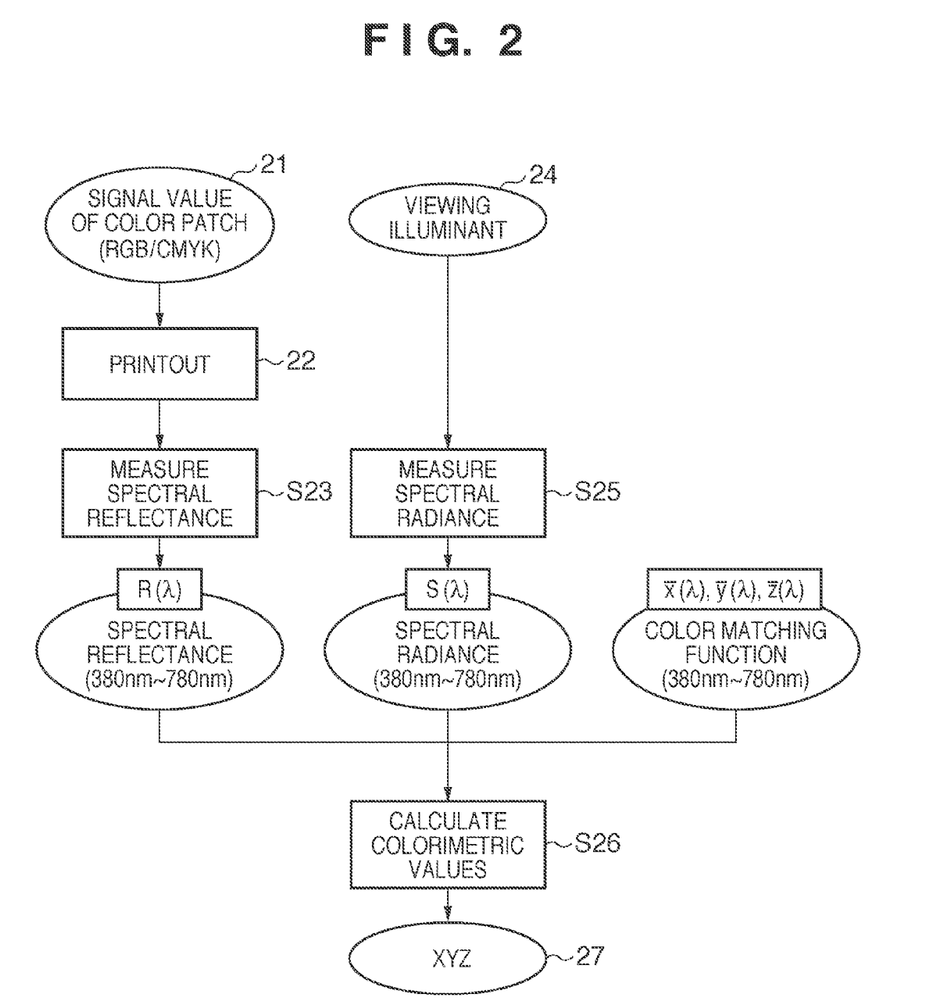

The sequence for obtaining color reproduction characteristics of an image output device will be described below with reference to FIGS. 1 and 2. The image output device forms a printout 22 by printing a color patch 12 on a predetermined medium 11. Then, the color patch 12 is irradiated with light coming from an illuminant (colorimetric illuminant) 13 of a colorimeter, and light reflected by the color patch 12 is received by a light-receiving device 15 via a spectroscope 14, thereby measuring a spectral radiance of the reflected light. By dividing the spectral radiance of the reflected light by that of the colorimetric illuminant 13, a spectral radiance $R(\lambda)$ of the color patch 12 is calculated (S23). Next, a spectral radiance $S(\lambda)$ of an illuminant (viewing illuminant) 24 of an output image viewing environment is measured (S25). Tristimulus values XYZ 27 are calculated based on the spectral radiance $R(\lambda)$, the spectral radiance $S(\lambda)$ of the viewing illuminant 24, and a color matching function $\bar{x}(\lambda)\bar{y}(\lambda)\bar{z}(\lambda)$ (S26) by:

$$X = k\int R(\lambda)S(\lambda)\bar{x}(\lambda)d\lambda$$

$$Y = k\int R(\lambda)S(\lambda)\bar{y}(\lambda)d\lambda$$

$$Z = k\int R(\lambda)S(\lambda)\bar{z}(\lambda)d\lambda \quad (1)$$

where $k = 100/\int S(\lambda)\bar{y}(\lambda)d\lambda$, and an integral range ranges from 380 to 780 nm.

That is, when the image output device prints color patches 12 of a large number of colors on the medium 11, and obtains colorimetric values (for example, tristimulus values XYZ 27) of the respective color patches, thus obtaining the relationship between signal values (for example, RGB values) 21 input to the image output device upon printing the color patches 12 and the colorimetric values. This correspondence relationship represents the color reproduction characteristics of the image output device.

However, when a material that produces fluorescence (for example, a fluorescent material such as a fluorescent whitener) is used as that of a medium (for example, a print sheet) used in image formation, the spectral radiance $R(\lambda)$ measured by the aforementioned method is often different from that under the viewing illuminant. Note that the fluorescent material emits light in a wavelength range (fluorescence wavelength range) different from an excitation wavelength range contained in illumination light. In general, a fluorescence wavelength is longer than an excitation wavelength.

Figure 3A:
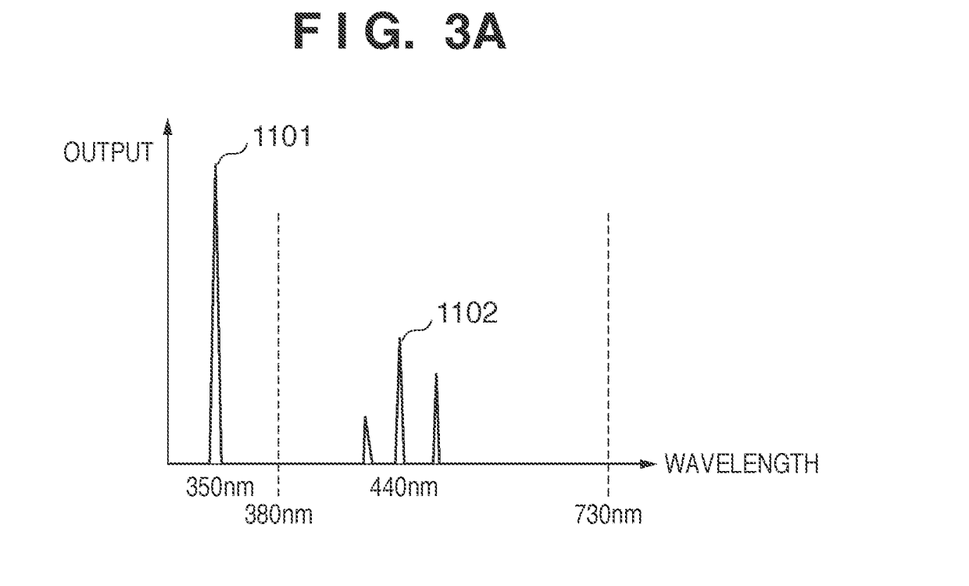
FIGS. 3A and 3B are graphs showing measured values of radiated light from a color patch when the color patch containing a fluorescent material is irradiated with monochromatic light.
Figure 3B:
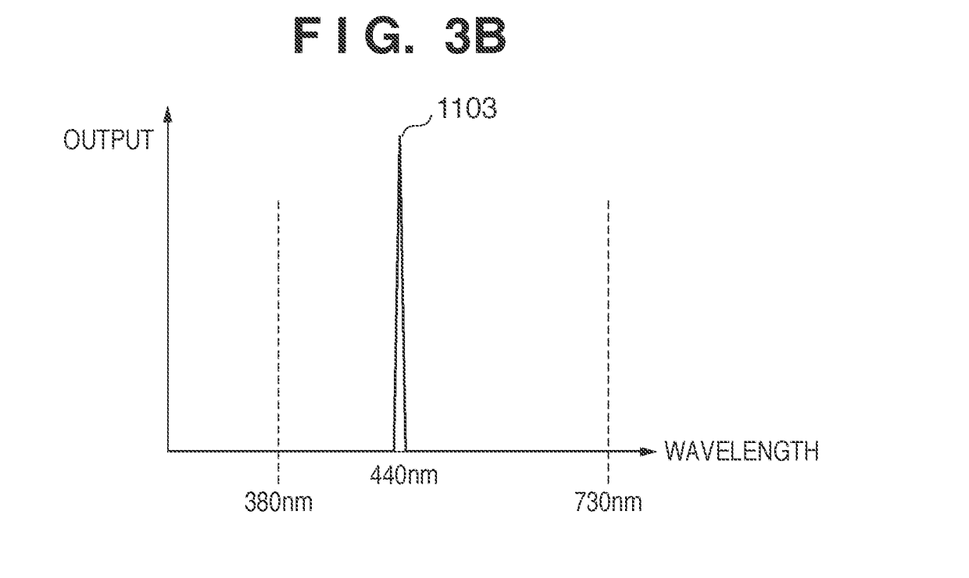

Graphs of FIGS. 3A and 3B show measured values of radiated light from a color patch when the color patch containing a fluorescent material is irradiated with monochromatic light. FIG. 3A shows the intensities of radiated light when the color patch is irradiated with monochromatic light of 350 nm. Radiated light 1101 is reflected light of the irradiated monochromatic light, and radiated light 1102 is fluorescence excited by the irradiated monochromatic light. On the other hand, FIG. 3B shows the intensities of irradiated light when the color patch is irradiated with monochromatic light of 440 nm. Radiated light 1103 is reflected light of the irradiated monochromatic light.

As shown in FIG. 3A, when the color patch contains a fluorescent material, and is irradiated with light of an excitation wavelength, the fluorescence 1102 having a wavelength different from that of the irradiated light is observed in addition to the reflected light 1101 of the wavelength of the irradiated light. On the other hand, as shown in FIG. 3B, when the color patch is irradiated with light of a wavelength different from the excitation wavelength, the reflected light 1103 of the wavelength of the irradiated light is observed. For this reason, under an illuminant including, for example, a 350-nm component and 450-nm component, light of 440 nm observed as the radiated light of the color patch is a sum of the fluorescence 1102 and reflected light 1103. Of course, since a general illuminant has many wavelength components, a sum total of the reflected light of 440 nm and fluorescence components of 440 nm for their respective wavelengths becomes a radiated light of 440 nm observed from the color patch under that illuminant.

Figure 4A:
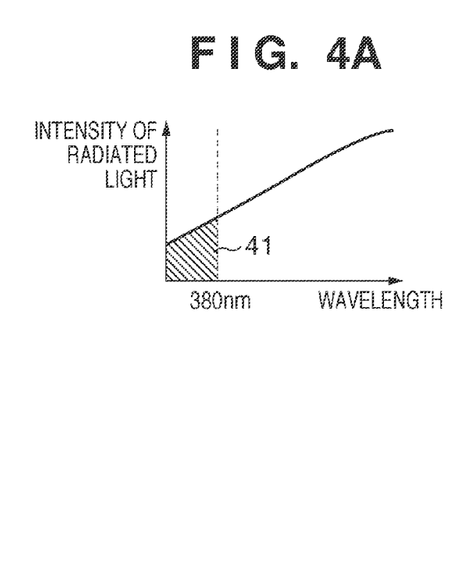
FIGS. 4A to 4C are graphs for explaining spectral reflectances of a sample containing a fluorescent material, an excitation wavelength of which falls within an ultraviolet range.
Figure 4B:
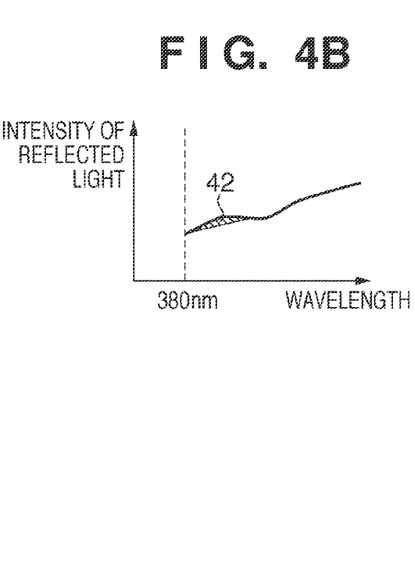
Figure 4C:
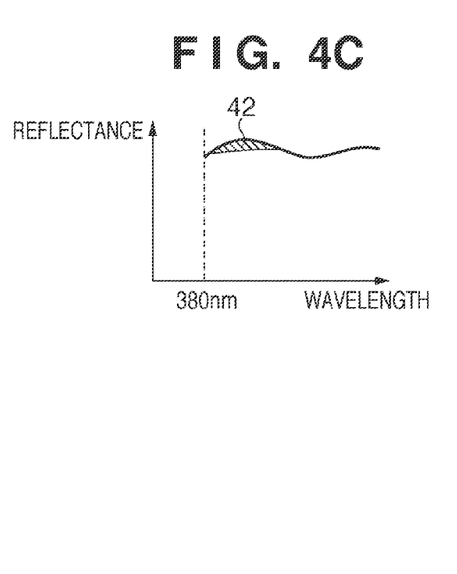

The spectral radiance $R(\lambda)$ of a sample containing a fluorescent material, an excitation wavelength which falls within an ultraviolet range, will be described below with reference to FIGS. 4A to 4C. When radiated light of the sample containing the fluorescent material is measured using the measurement system shown in FIG. 1, the fluorescent material reacts with light in an ultraviolet range 41 in FIG. 4A contained in the radiated light, thus emanating light in a fluorescence wavelength range 42 in FIG. 4B. That is, a colorimeter receives, from the sample, radiated light added with fluorescence which depends on a light energy in the ultraviolet range (excitation wavelength range) 41 of the colorimetric illuminant 13. As a result, the spectral radiance $R(\lambda)$ also depends on the light energy of the ultraviolet range 41 of the colorimetric illuminant 13 (FIG. 4C). When the colorimetric illuminant 13 is the same as the viewing illuminant 24, since fluorescence corresponding to the light energy in the excitation wavelength range of the viewing illuminant 24 is obtained upon measurement, correct colorimetric values are calculated. On the other hand, when the colorimetric illuminant 13 is different from the viewing illuminant 24, since fluorescence, which does not correspond to the light energy in the excitation wavelength range of the viewing illuminant 24, is obtained upon measurement, correct tristimulus values cannot be calculated.

As a method of obtaining tristimulus values from a sample printed on a medium containing a fluorescent material, a method using a bi-spectral radiance factor is available. The bi-spectral radiance factor is a bivariable function $F(\mu, \lambda)$ that represents a spectral radiance of a sample with respect to incident light of a wavelength $\mu$, and can express a fluorescence amount radiated in a wavelength range different from that of irradiated light. Using the bi-spectral radiance factor, CIEXYZ values that consider fluorescence can be calculated using:

$$X = k\int_\lambda \{\int_\mu F(\mu,\lambda)S(\mu)d\mu \cdot \bar{x}(\lambda)\}d\lambda$$

$$Y = k\int_\lambda \{\int_\mu F(\mu,\lambda)S(\mu)d\mu \cdot \bar{y}(\lambda)\}d\lambda$$

$$Z = k\int_\lambda \{\int_\mu F(\mu,\lambda)S(\mu)d\mu \cdot \bar{z}(\lambda)\}d\lambda \quad (2)$$

where $k = 100/\int_\lambda S(\lambda)\bar{y}(\lambda)d\lambda$, an integral range of $\int_\lambda$ ranges from 380 to 780 nm, and an integral range of $\int_\mu$ ranges from 300 to 780 nm.

However, measurement of the bi-spectral radiance factor requires a measuring device such as a bi-spectral fluorescence colorimeter which includes spectroscopes on both the illumination and light-receiving sides. In addition, the bi-spectral radiance factors for incident light have to be measured per sample in increments of 10 nm within the range from 300 nm to 780 nm, and the measurement requires an immense amount of time. In other words, it is not practical to prepare a large number of color charts obtained by printing a large number of color patches on a large number of media, and to measure bi-spectral radiance factors for respective color patches.

In case of a sample printed on a medium containing a fluorescent material, only excitation light according to a spectral transmittance of a color material reaches the medium on a portion where the color material covers a surface of the medium. Therefore, fluorescence radiated from the medium depends not only on the excitation light amount and the fluorescence characteristics of the medium but also on the spectral reflectance of the color material and a factor at which the color material covers the surface of the medium (to be referred to as a covering factor hereinafter). Japanese Patent Laid-Open No. 2006-292510 (patent literature 1) describes an invention that estimates bi-spectral radiance factors of a sample based on bi-spectral radiance factors of a medium, a spectral transmittance of a color material, and a covering factor of the color material.

According to the invention of patent literature 1, as an estimation reference of the covering factor, a reference printed surface on which color materials alone and combinations of a plurality of color materials are printed at a covering ratio of 100%, and the spectral radiances of the reference printed surface are measured. Next, the spectral radiances of samples are measured, and the covering ratios of the color materials on the samples are estimated based on the spectral radiances of the reference printed surface. Then, the bi-spectral radiance factors of the samples are estimated from the estimated covering ratios, bi-spectral radiance factors of a medium, which are measured in advance, and spectral transmittances of the respective color materials.

The invention of patent literature 1 prepares for the spectral radiances of the reference printed surface, the bi-spectral radiance factors of the medium, and the spectral transmittances of the respective color materials in advance, so as to estimate the bi-spectral radiance factors of the samples. Furthermore, in order to estimate the covering ratios, total spectral radiances of the samples have to be measured under a measurement illuminant. Therefore, according to the invention of patent literature 1, measurements can be simplified compared to a case in which bi-spectral radiance factors of a large number of color patches are measured. However, various kinds of information have to be prepared for estimation, and the invention of patent literature 1 is not practical.

SUMMARY OF THE INVENTION

In one aspect, a color processing method comprising the steps of: obtaining spectral reflectances of color patches formed on a medium; inputting bi-spectral radiance factors of the medium; and computing bi-spectral radiance factors of the color patches based on the spectral reflectances of the color patches and the bi-spectral radiance factors of the medium.

According to the aspect, bi-spectral radiance factors of samples can be easily obtained.

Further features of the present invention will become apparent from the following description of exemplary embodiments with reference to the attached drawings.

DESCRIPTION OF THE EMBODIMENTS

Color processing according to embodiments of the present invention will be described in detail hereinafter with reference to the drawings.

First Embodiment

As described above, when a medium contains a fluorescent material, bi-spectral radiance factors of samples have to be used so as to accurately obtain colorimetric values of the samples under an arbitrary viewing environment. However, measurements of the bi-spectral radiance factors require a measuring device such as a bi-spectral fluorescence colorimeter and an immense amount of measurement time. Hence, in this embodiment, from bi-spectral radiance factors of a medium, bi-spectral radiance factors, which are caused by the medium and color materials, on samples on which color materials are superposed, are computed. Note that color patches formed by printing color materials on the medium will be referred to as samples hereinafter.

[Arrangement of Apparatus]

Figure 5:
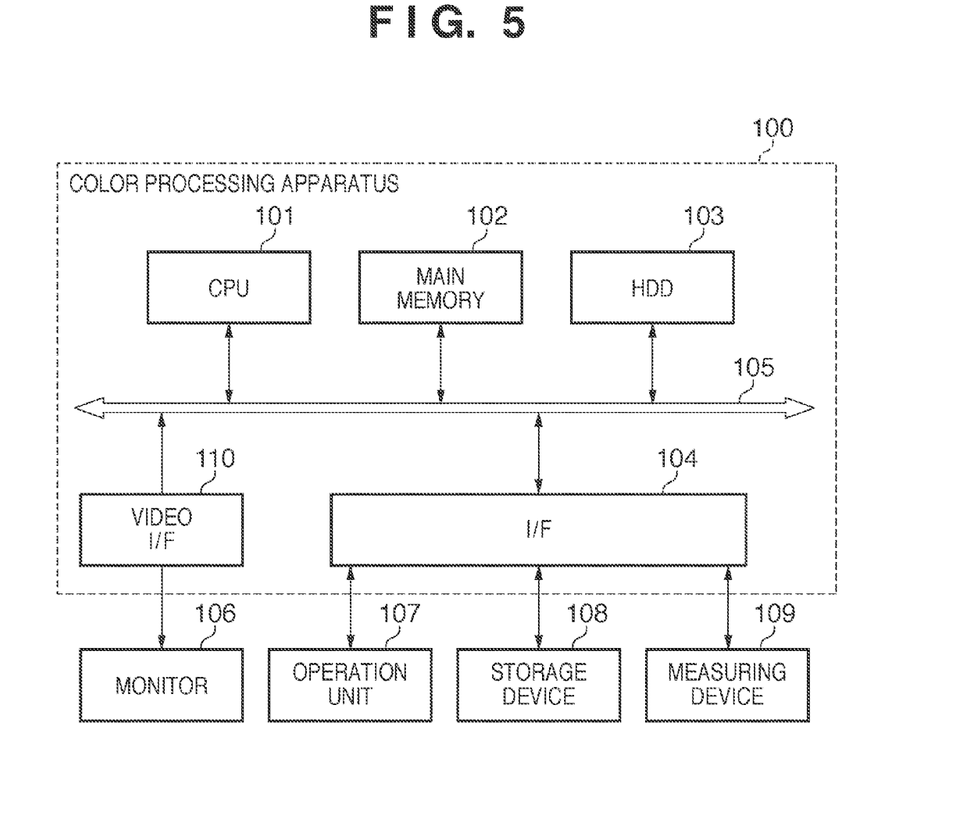
FIG. 5 is a block diagram for explaining the arrangement of a color processing apparatus according to an embodiment.

The arrangement of a color processing apparatus 100 of this embodiment will be described below with reference to the block diagram shown in FIG. 5. A microprocessor (CPU) 101 executes an operating system (OS) and various programs stored in a ROM of a main memory 102 and a hard disk drive (HDD) 103 using, for example, a RAM of the main memory 102 as a work memory. Then, the CPU 101 controls components which will be described below via a system bus 105. A general-purpose interface (I/F) 104 is, for example, a serial bus interface such as USB (Universal Serial Bus) or IEEE1394. To the I/F 104, an operation unit 107 which includes a keyboard and mouse and inputs user instructions, a storage device 108, and a measuring device 109 which measures spectral reflectances and the like, are connected. To a video I/F 110, a monitor 106 is connected.

The CPU 101 loads a color processing program which implements color processing of this embodiment, and data from the HDD 103 or storage device 108 onto the RAM, and executes the color processing program according to a user instruction via a user interface, which is displayed on the monitor 106. Then, the CPU 101 stores the color processing result in the HDD 103 or storage device 108.

Color Processing Unit

The functional arrangement of a color processing unit 201 implemented by the color processing program will be described below with reference to the block diagram shown in FIG. 6. Note that the color processing unit 201 corresponds to a principal module of functions implemented by the CPU 101 using the color processing program.

A media characteristic input unit 202 inputs bi-spectral radiance factors of a medium from a storage unit 210, which corresponds to the HDD 103 or storage device 108, in accordance with a user instruction input from the operation unit 107. A viewing illuminant information input unit 203 inputs spectral radiances of a viewing illuminant from the storage unit 210 in accordance with a user instruction input from the operation unit 107. A sample information input unit 204 inputs spectral radiances of samples by controlling the measuring device 109 or inputs them from the storage unit 210 in accordance with a user instruction input from the operation unit 107. The computing unit 205 computes bi-spectral radiance factors of the samples based on the bi-spectral radiance factors of the medium and the spectral radiances of the samples. A calculation unit 206 calculates colorimetric values (for example, CIE tristimulus values XYZ) of the samples based on the computed bi-spectral radiance factors of the samples and the spectral radiances of the viewing illuminant.

[Color Processing]

Figure 7:
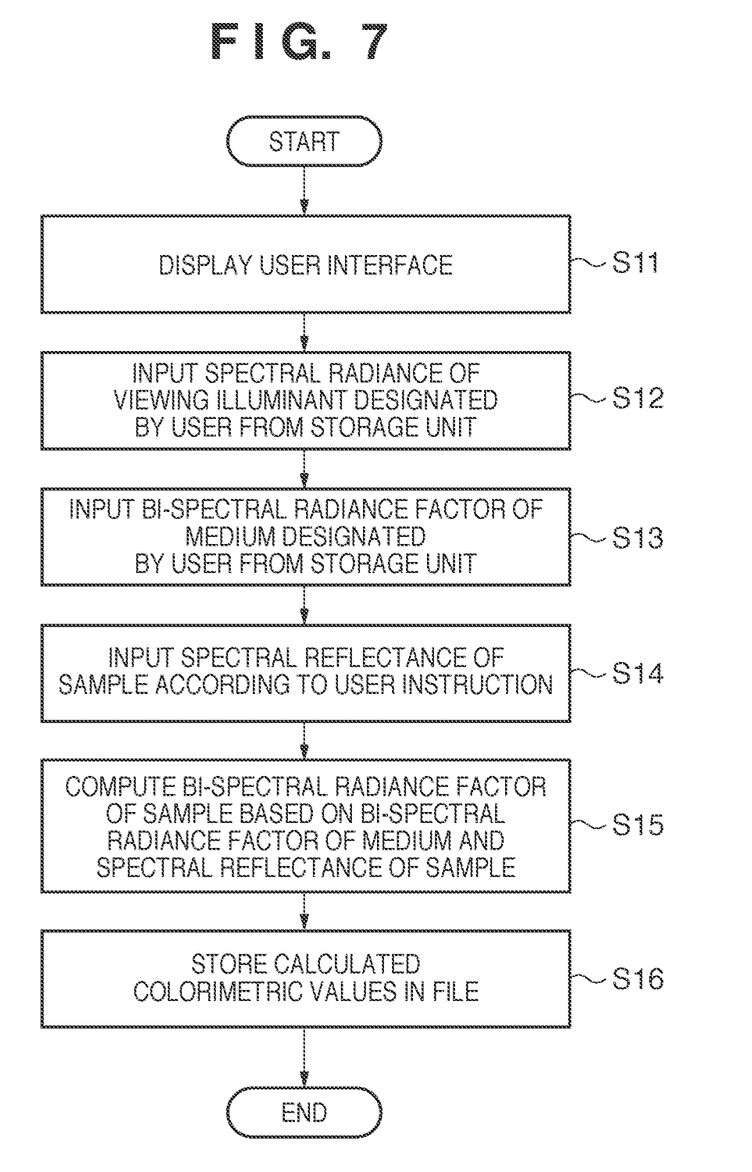
FIG. 7 is a flowchart for explaining the processing of the color processing unit.

The processing of the color processing unit 201 will be described below with reference to the flowchart shown in FIG. 7. The color processing unit 201 displays a user interface (UI) used to obtain information required for the processing from the user on the monitor 106 (S11).

Figure 8:
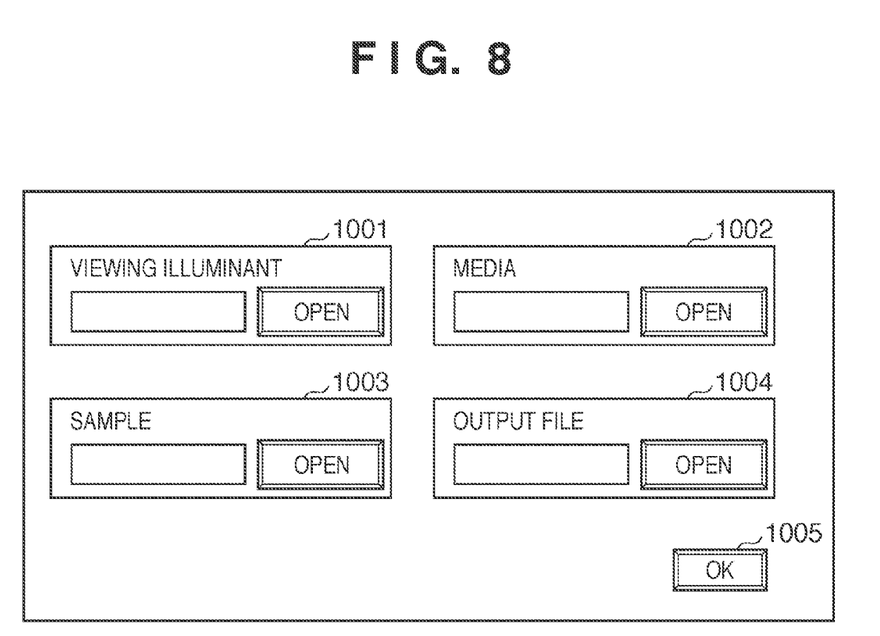
FIG. 8 is a view for explaining an example of a UI of the color processing unit.

An example of the UI of the color processing unit 201 will be described below with reference to FIG. 8. A viewing illuminant input field 1001 allows the user to select or input a name or symbol of a viewing illuminant. A media input field 1002 allows the user to select or input a name or symbol of a medium. A sample information input field 1003 allows the user to select or input a name or symbol of a sample. When the user presses a browse button and selects "spectral radiance measurement", the measuring device 109 measures spectral radiances of samples. An output file name input field 1004 allows the user to select or input a data file name used to store data such as colorimetric values. When the user presses an "OK" button 1005 after he or she selects or inputs required information in the respective input fields, the subsequent processes are executed.

The color processing unit 201 controls the viewing illuminant information input unit 203 to input the spectral radiances of the viewing illuminant designated by the user from the storage unit 210 (S12).

Figure 9:
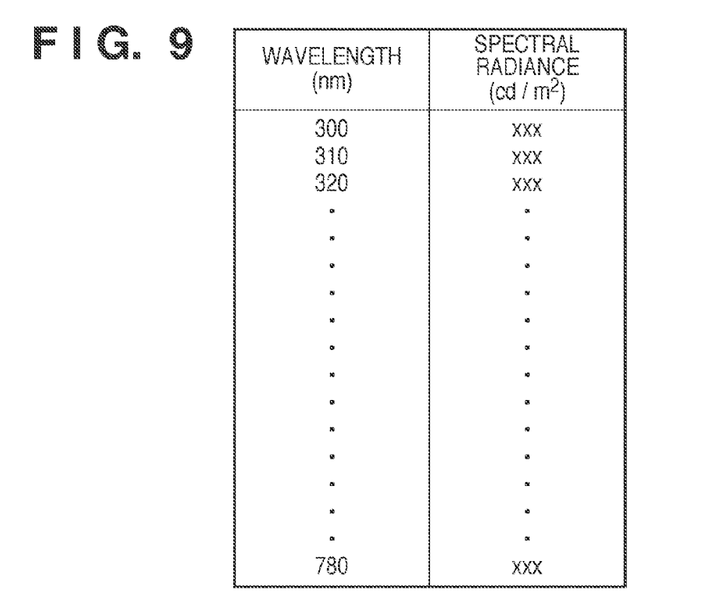
FIG. 9 is a table for explaining an example of the data structure of spectral radiance data.

An example of the data structure of spectral radiance data will be described below with reference to FIG. 9. The spectral radiance data describes, for example, spectral radiances of a certain illuminant with respect to wavelengths in increments of 10 nm within the range from 300 nm to 780 nm, as shown in FIG. 9. In general, a visible wavelength range ranges from 380 nm to 780 nm. However, since fluorescence is to be taken into consideration in this embodiment, spectral radiances which include a fluorescence excitation wavelength range are required. The excitation wavelength range is decided by a florescent material such as a fluorescent whitener contained in a medium, and for example, a range from 300 nm to 380 nm will be explained as the excitation wavelength range hereinafter.

The color processing unit 201 controls the media characteristic input unit 202 to input the bi-spectral radiance factors of the medium designated by the user from the storage unit 210 (S13).

Figure 10:
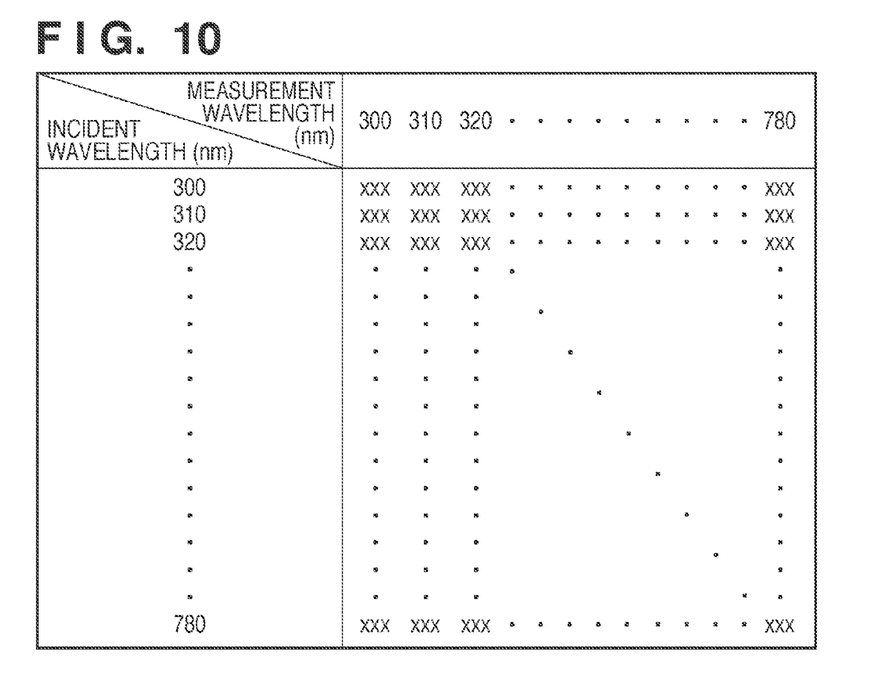
FIG. 10 is a table for explaining an example of the data structure of bi-spectral radiance factor data.

An example of the data structure of bi-spectral radiance factor data will be described below with reference to FIG. 10. As shown in FIG. 10, the bi-spectral radiance factor data are two-dimensional data which describe, for example, spectral radiances from a medium at wavelengths in increments of 10 nm within the range from 300 nm to 780 nm when light of a certain single wavelength (to be referred to as monochromatic light hereinafter) is incident on a certain medium.

Figure 11:
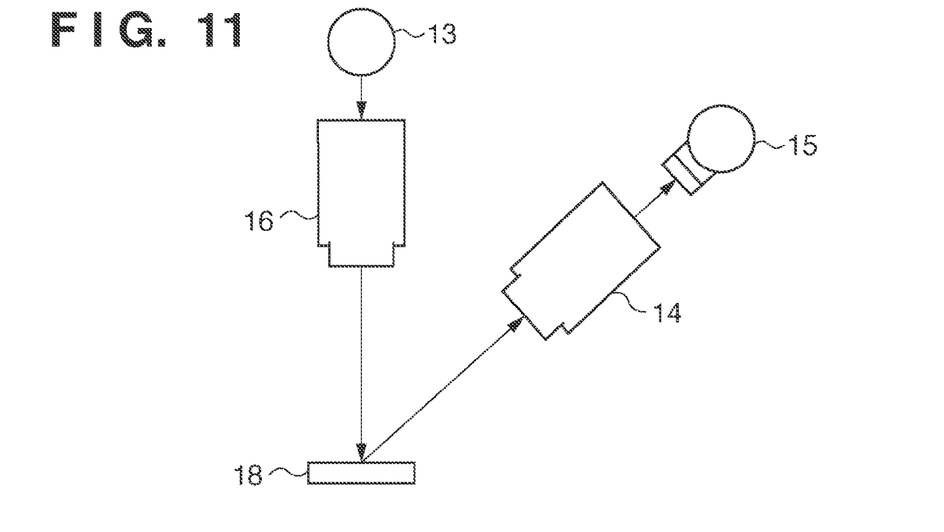
FIG. 11 is a view for explaining an overview of a measurement of a bi-spectral radiance factor.

An overview of a measurement of a bi-spectral radiance factor will be described below with reference to FIG. 11. A spectroscope 16 extracts monochromatic light from radiated light of an illuminant 13, and a sample 18 is irradiated with the monochromatic light. Then, radiated light from the sample 18 is received by a light-receiving device 15 via a spectroscope 14, thus measuring a spectral radiance. Then, the measured spectral radiance is divided by that of the monochromatic light, thus obtaining a spectral radiance when the sample 18 is irradiated with the monochromatic light, in other words, a spectral radiance with respect to a certain incident wavelength. That is, the spectroscope 16 irradiates the sample 18 with monochromatic light rays of wavelengths in increments of 10 nm within the range from 300 nm to 780 nm, so as to obtain spectral radiances with respect to the wavelengths of the monochromatic light rays, thereby obtaining the bi-spectral radiance factor data shown in FIG. 10 of the sample 18.

The color processing unit 201 controls the sample information input unit 204 to input spectral reflectances of a sample according to a user instruction (S14).

Figure 12:
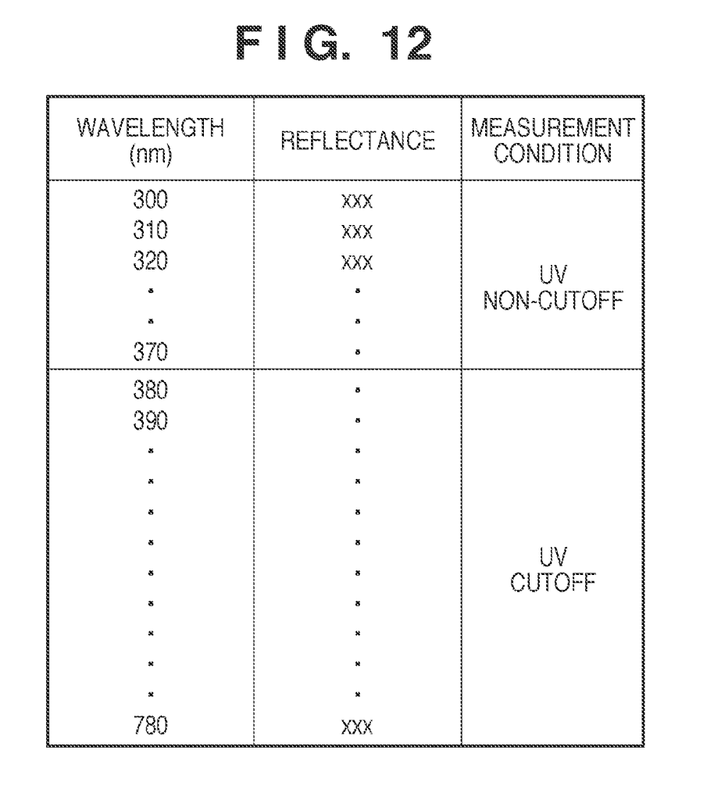
FIG. 12 is a table for explaining an example of the data structure of spectral reflectance data.

An example of the data structure of spectral reflectance data will be described below with reference to FIG. 12. As shown in FIG. 12, the spectral reflectance data describes reflectances of a sample with respect to wavelengths in increments of 10 nm within the visible range (for example, the range from 380 nm to 780 nm) and the excitation wavelength range (for example, the range from 300 nm to 380 nm).

Figure 13:
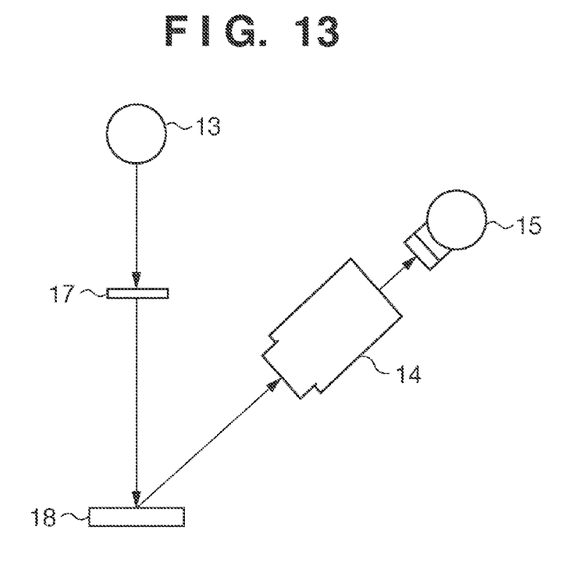
FIG. 13 is a view for explaining an overview of a measurement of a spectral reflectance of a sample.

An overview of a measurement of a spectral reflectance of a sample will be described below with reference to FIG. 13. The sample 18 is irradiated with radiated light of the illuminant 13 via a filter 17 which cuts, for example, ultraviolet rays, and radiated light from the sample 18 is received by the light-receiving device 15 via the spectroscope 14, thus measuring a spectral radiance within the visible range. That is, in order to prevent production of fluorescence, the measurement is made under a measurement condition (for example, UV cutoff) in which light in the excitation wavelength range is cut. Then, the measured spectral radiance is divided by that of light which is output from the illuminant 13 and passes through the filter 17, thus obtaining a spectral reflectance of the sample 18 in the visible range. Note that an intensity of light, with which the sample is irradiated via the filter 17, at a wavelength less than 380 nm is sufficiently small, and the sample does not produce fluorescence having an excitation wavelength range less than 380 nm.

Subsequently, the sample 18 is irradiated with radiated light of the illuminant 13 without going through the filter 17, and radiated light from the sample 18 is received by the light-receiving device 15 via the spectroscope 14, thereby measuring a spectral radiance in the excitation wavelength range. That is, in order to measure a spectral reflectance in the excitation wavelength range, for example, UV cutoff is skipped. Then, the measured spectral radiance is divided by that of the illuminant 13, thus obtaining a spectral reflectance of the sample 18 in the excitation wavelength range.

The general measurement sequence of a spectral reflectance of a sample has been described. The measurement sequence of a spectral reflectance of a sample is summarized as follows. (i) Using an illuminant which radiates light in the visible range, in other words, an illuminant which does not radiate any light whose wavelength is shorter than the visible range and falls outside the visible range or which has a sufficiently low intensity of radiated light outside the visible range, a spectral reflectance of the sample 18 is measured in the visible range. (ii) Using an illuminant which radiates light outside the visible range (an illuminant which may or may not radiate light in the visible range), a spectral reflectance of the sample 18 is measured in a range outside the visible range.

Next, the color processing unit 201 controls the computing unit 205 to compute the bi-spectral radiance factors of the sample based on the bi-spectral radiance factors of the medium and the spectral reflectances of the sample (S15). Furthermore, the color processing unit 201 controls the calculation unit 206 to calculate colorimetric values based on the bi-spectral radiance factors of the sample and the spectral radiances of the viewing illuminant using equations (2) (S16). Moreover, the color processing unit 201 stores the calculated colorimetric values in a file having the file name designated by the user and saves the file in the storage unit 210 (S17). Note that the computing unit 205 and calculation unit 206 repeat computation and calculation processes in correspondence with the number of samples (color patches), thus calculating colorimetric values when color patches printed on the medium designated by the user are viewed under the viewing illuminant designated by the user.

Computing Unit

Figure 14A:
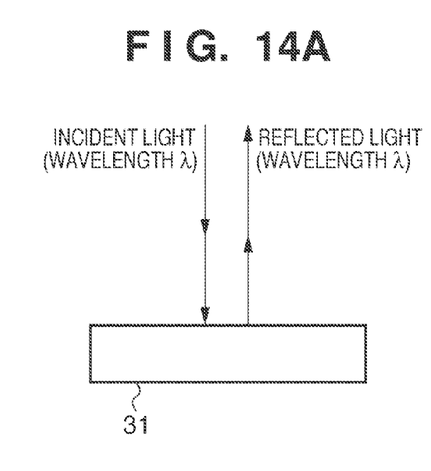
FIGS. 14A and 14B are conceptual views for explaining a spectral reflectance of a medium and that of a sample.

A spectral reflectance of a medium 31 and that of a sample will be described below with reference to the conceptual views shown in FIGS. 14A and 14B. Note that a sample is a color patch formed by printing a color material 32 on the medium 31. FIG. 14A shows reflected light when the medium 31 is irradiated with light which does not contain light in the excitation wavelength range. The medium 31 irradiated with light of a wavelength $\lambda$ radiates light of the wavelength $\lambda$ having an intensity according to its spectral reflectance $Fw(\lambda)$.

Figure 14B:
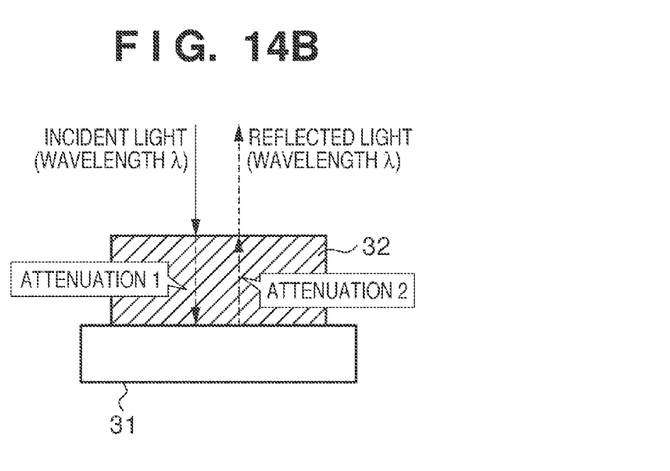

On the other hand, FIG. 14B shows reflected light when the color material 32 printed on the medium 31 is irradiated with light which does not contain light in the excitation wavelength range. Incident light of the wavelength $\lambda$ is attenuated by the color material 32, and then reaches the medium 31. The medium 31 irradiated with the light of the wavelength $\lambda$, which is attenuated by the color material 32, radiates light of the wavelength $\lambda$ having an intensity according to its spectral reflectance $Fw(\lambda)$. Then, reflected light of the wavelength $\lambda$ from the medium 31 is attenuated by the color material 32 again.

In other words, a spectral reflectance $R0(\lambda)$ of a sample is considered as a result obtained by multiplying the spectral reflectance $Fw(\lambda)$ of the medium 31 by a square of an attenuation of light by the color material 32. That is, the spectral reflectance $R0(\lambda)$ of the sample and the spectral reflectance $Fw(\lambda)$ of the medium 31 have the following relationship:

$$R0(\lambda)=T(\lambda)^2 Fw(\lambda)$$

$$T(\lambda)=\sqrt{\{R0(\lambda)/Fw(\lambda)\}} \quad (3)$$

where $T(\lambda)$ is a spectral attenuation (a reciprocal of a spectral transmittance) of the color material.

Figure 15:
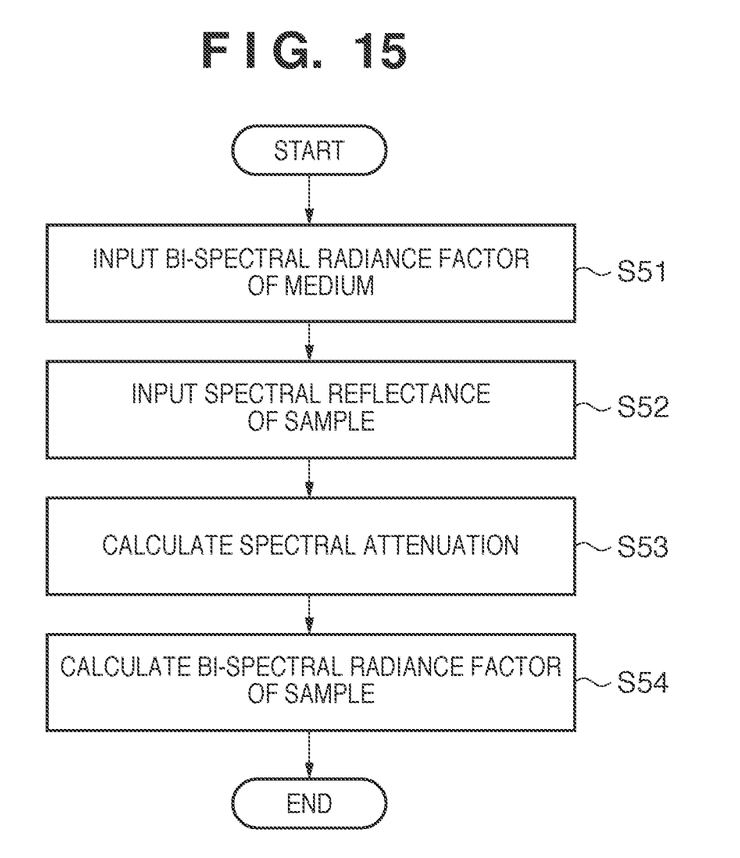
FIG. 15 is a flowchart for explaining the processing of a computing unit.

The processing (S15) of the computing unit 205 will be described below with reference to the flowchart shown in FIG. 15.

The computing unit 205 inputs bi-spectral radiance factors $Fw(\mu, \lambda)$ of the medium (S51), and inputs the spectral reflectances $R0(\lambda)$ of the sample (S52). In the bi-spectral radiance factor data shown in FIG. 10, a spectral radiance $Fw(\lambda, \lambda)$ in a cell in which an incident wavelength is equal to a measurement wavelength represents a ratio of an intensity of reflected light (which does not contain any fluorescence) of the wavelength $\lambda$ of the medium with respect to that of incident light of the wavelength $\lambda$. That is, $Fw(\lambda, \lambda)$ corresponds to a reflectance of the medium at the wavelength $\lambda$. Thus, the computing unit 205 extracts a spectral radiance $Fw(\lambda, \lambda)$ of the medium when the incident wavelength is equal to the measurement wavelength from the bi-spectral radiance factors $Fw(\mu, \lambda)$ of the medium, and calculates the spectral attenuation $T(\lambda)$ (S53) using:

$$T(\lambda)=\sqrt{\{R0(\lambda)/Fw(\lambda,\lambda)\}} \quad (4)$$

Next, the computing unit 205 calculates each bi-spectral radiance factor $Fe(\mu, \lambda)$ of the sample (S54) using:

$$Fe(\mu,\lambda)=Fw(\mu,\lambda)T(\mu)T(\lambda) \quad (5)$$

where $\mu$ is a wavelength of incident light, $\lambda$ is a wavelength of reflected light, $T(\mu)$ is an attenuation at the wavelength $\mu$, and $T(\lambda)$ is an attenuation at the wavelength $\lambda$.

Figure 16:
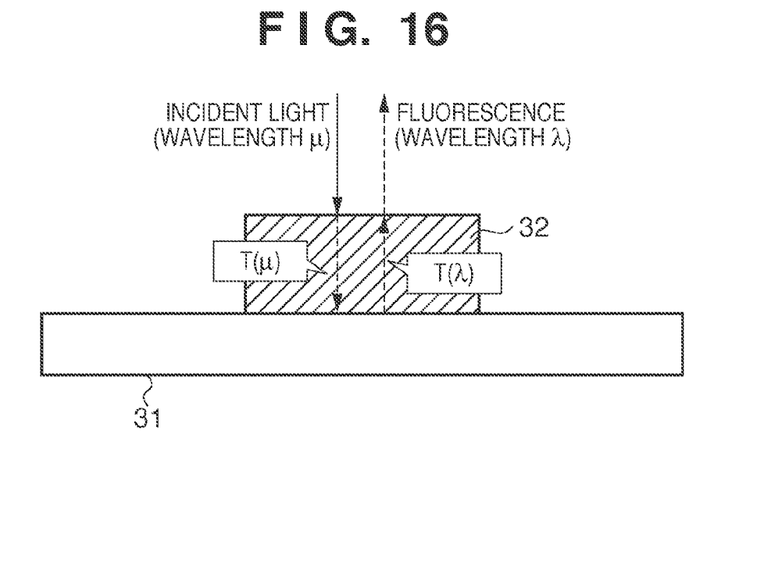
FIG. 16 is a view for explaining the computing concept of a bi-spectral radiance factor of a sample.

The computation concept of the bi-spectral radiance factor $Fe(\mu, \lambda)$ of the sample will be described below with reference to FIG. 16. Incident light of the wavelength $\lambda$ is attenuated according to the spectral attenuation $T(\mu)$ of the color material 32 when it passes through the color material 32. When light of the wavelength $\mu$, which reaches the medium 31 via the color material 32, has an excitation wavelength, the medium 31 which contains a florescent material produces fluorescence of the wavelength $\lambda$ having an intensity according to the bi-spectral radiance factor $Fw(\mu, \lambda)$. The fluorescence of the wavelength $\lambda$ is attenuated according to the spectral attenuation $T(\lambda)$ of the color material 32 when it passes through the color material 32. Therefore, when the sample is irradiated with light of the wavelength $\mu$, the intensity of light of the wavelength $\lambda$ radiated from the sample assumes a value obtained by multiplying the intensity of incident light by the attenuations $T(\mu)$ and $T(\lambda)$. In other words, each bi-spectral radiance factor $Fe(\mu, \lambda)$ of the sample assumes a value obtained by multiplying the bi-spectral radiance factor $Fw(\mu, \lambda)$ of the medium 31 by the attenuations $T(\mu)$ and $T(\lambda)$, as given by equation (5).

When the bi-spectral radiance factors of the medium and the spectral radiances of color patches printed on the medium are measured in this way, the bi-spectral radiance factors of the color patches can be computed. Therefore, using the bi-spectral radiance factors of the color patches, colorimetric values of color patches printed on various media under various viewing illuminants can be accurately calculated. Note that various media include those which do not contain any florescent material, those containing fluorescent materials which have excitation wavelengths within a range outside the visible range and produce fluorescence in the visible range, and those containing fluorescent materials which have excitation wavelengths within the visible range and produce fluorescence in the visible range. Also, various illuminants include those which emit light rays of excitation wavelengths of florescent materials contained in media, and those which do not emit light rays of excitation wavelengths of florescent materials contained in media.

Second Embodiment

Color processing according to the second embodiment of the present invention will be described hereinafter. Note that the same reference numerals in the second embodiment denote the same components as in the first embodiment, and a detailed description thereof will not be repeated.

Figure 6:
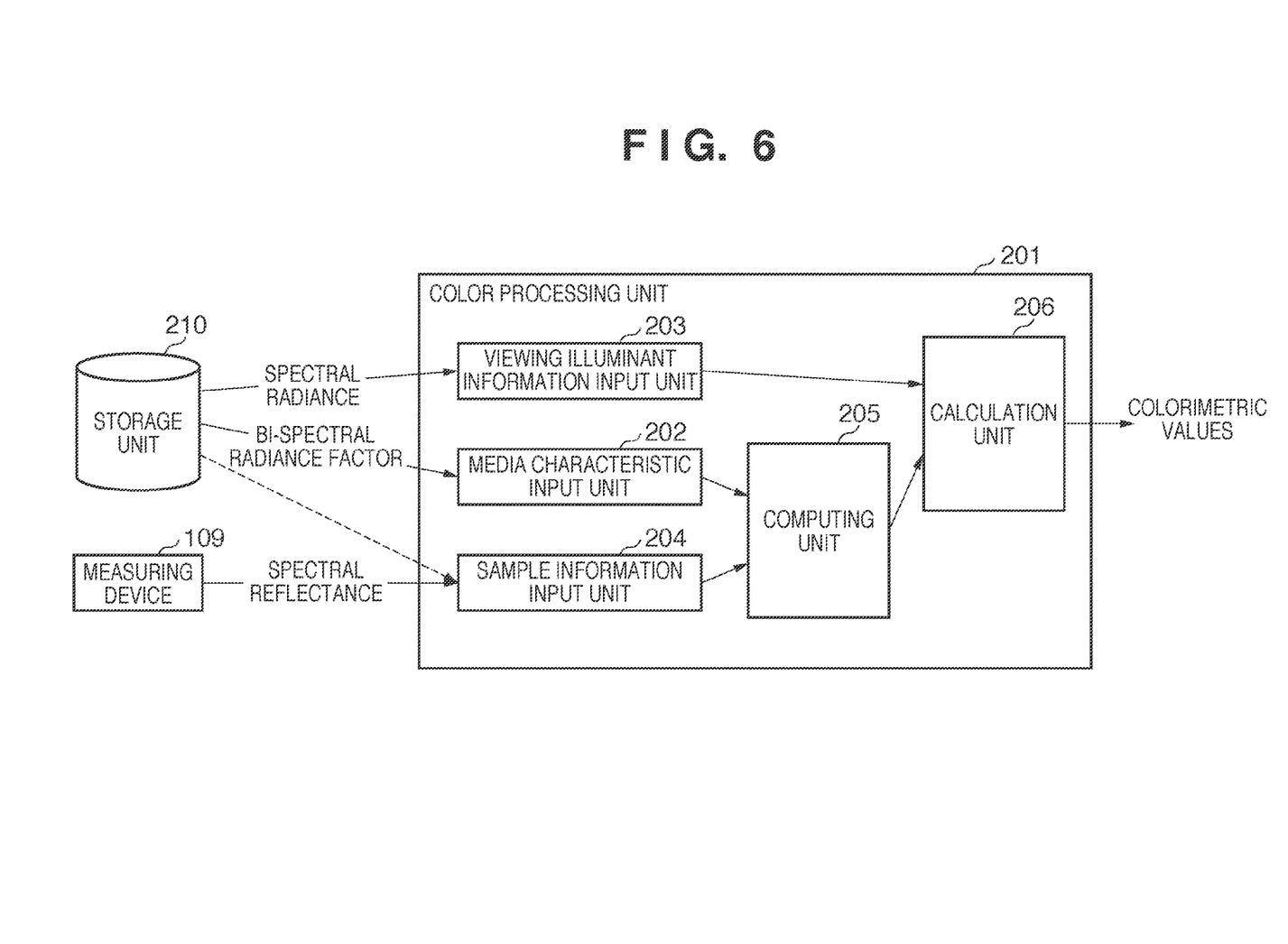
FIG. 6 is a block diagram for explaining the functional arrangement of a color processing unit, which is implemented by a color processing program.

Functions of the color processing unit 201 shown in FIG. 6 can be incorporated in a measurement apparatus. The arrangement of a measurement apparatus 401 according to the second embodiment will be described below with reference to the block diagram shown in FIG. 17.

Figure 17:
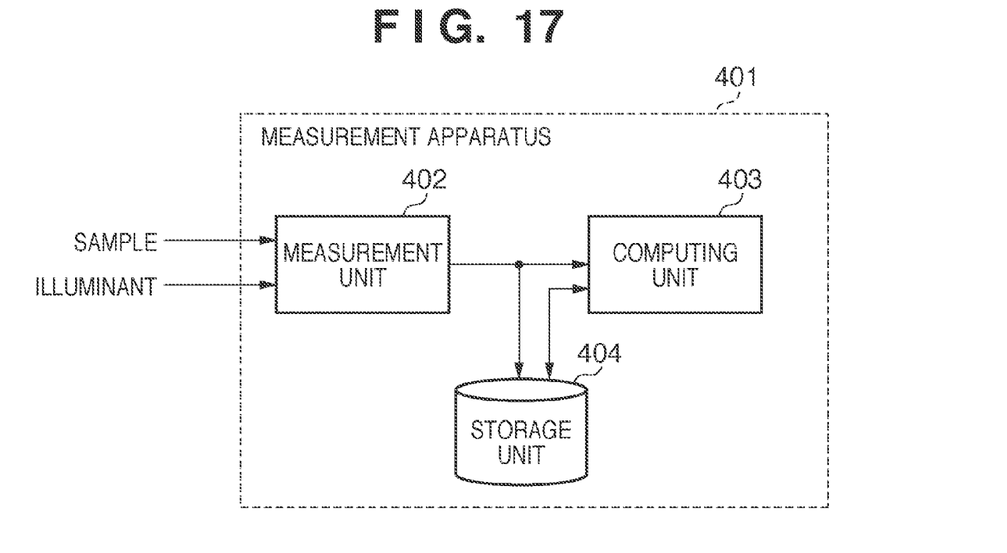
FIG. 17 is a block diagram for explaining the arrangement of a measurement apparatus according to the second embodiment.

A measurement unit 402 measures, for example, spectral radiances of an illuminant and spectral reflectances of samples. A computing unit 403 inputs the spectral radiances of the illuminant and the spectral reflectances of the samples measured by the measurement unit 402, calculates bi-spectral radiance factors of the samples, and computes colorimetric values of the samples under a viewing illuminant. A storage unit 404 stores measured values of the measurement unit 402, various data required for computations of the computing unit 403, and computation results. That is, the measurement unit 402 corresponds to the measuring device 109 shown in FIG. 6, the computing unit 403 corresponds to the color processing unit 201 shown in FIG. 6, and the storage unit 404 corresponds to the storage unit 210 shown in FIG. 6.

Note that the bi-spectral radiance factors of a medium are saved in the storage unit 404. Data stored in the storage unit 404 can be read out by an external computer or information processing apparatus via an interface (not shown; for example, a USB interface).

Modification of Embodiments

The first and second embodiments have exemplified the case in which colorimetric values (XYZ values) of samples corresponding to a viewing illuminant are output. However, the present invention is not limited to such specific output values. For example, the bi-spectral radiance factors of samples may be output, or CIELab values on a uniform color space or values (Jab values) on a color appearance space such as CIECAM02 may be output. A profile may be created using the colorimetric values of the computation results, and the created profile may be output. The profile describes color reproduction characteristics of a device used by a color management system. For example, a general profile for an RGB printer stores an LUT which represents the correspondence relationship between RGB values and XYZ values (or Lab values or Jab values) of color patches of $9^3$=729 colors obtained by respectively dividing RGB value ranges in 9 steps.

Also, the present invention is applicable to a measuring device incorporated in an image input device, image display device, or image output device. For example, when the present invention is applied to a measuring device incorporated in a printer, the present invention can be used in calibration of color reproduction characteristics of that printer, and creation and updating of a profile of that printer.

In the example of the above description, the media characteristic input unit 202 inputs the bi-spectral radiance factors of a medium from the storage unit 210. Alternatively, the media characteristic input unit 202 may control the measuring device 109 to measure the bi-spectral radiance factors of the medium and may input the bi-spectral radiance factors of the measurement results. Likewise, in the example of the above description, the viewing illuminant information input unit 203 inputs the spectral radiances of a viewing illuminant from the storage unit 210. Alternatively, the viewing illuminant information input unit 203 may control the measuring device 109 to measure the spectral radiances of the viewing illuminant, and may input the spectral radiances of the measurement results.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-186539, filed Aug. 23, 2010, which is hereby incorporated by reference herein in its entirety.

What is claimed is:

1. A color processing apparatus comprising:
an obtaining section, configured to obtain, by using one or more processors, spectral reflectances of color patches formed on a medium, wherein the spectral reflectances of the color patches are measured under a condition in which light having an excitation wavelength is cut;
a first inputting section, configured to input, by using one or more processors, bi-spectral radiance factors of the medium on which no color patch is formed, wherein the bi-spectral radiance factors represent spectral radiance factors of the medium in a predetermined wavelength range when monochromatic light is incident on the medium; and
a computing section, configured to compute, by using one or more processors, bi-spectral radiance factors of the color patches formed on the medium based on the spectral reflectances of the color patches and the bi-spectral radiance factors of the medium, wherein the computing section extracts a spectral radiance of the medium when an incident wavelength is equal to a measurement wavelength from the bi-spectral radiance factors of the medium, computes spectral attenuations of color materials used to form the color patches based on the spectral radiance of the medium and the spectral reflectances of the color patches, and computes the bi-spectral radiance factors of the color patches based on the spectral attenuations of the color materials and the bi-spectral radiance factors of the medium.

2. The apparatus according to claim 1, further comprising:
a second inputting section, configured to input, by using one or more processors, spectral radiances of a viewing illuminant of the color patches; and
a calculator, configured to calculate, by using one or more processors, colorimetric values of the color patches under the viewing illuminant based on the spectral radiances of the viewing illuminant and the bi-spectral radiance factors of the color patches.

3. The apparatus according to claim 1, wherein the obtaining section obtains spectral reflectances of the color patches measured in a visible range using an illuminant which radiates light in the visible range, and further obtains spectral reflectances of the color patches measured in a range outside the visible range using an illuminant which radiates light having the excitation wavelength shorter than wavelengths of the visible range.

4. The apparatus according to claim 3, wherein the first inputting section inputs bi-spectral radiance factors of the medium measured from the range outside the visible range to the visible range.

5. A color processing method comprising:
using at least one processor to perform the steps of:
obtaining spectral reflectances of color patches formed on a medium, wherein the spectral reflectances of the color patches are measured under a condition in which light having an excitation wavelength is cut;
inputting bi-spectral radiance factors of the medium on which no color patch is formed, wherein the bi-spectral radiance factors represent spectral radiance factors of the medium in a predetermined wavelength range when monochromatic light is incident on the medium; and
computing bi-spectral radiance factors of the color patches formed on the medium based on the spectral reflectances of the color patches and the bi-spectral radiance factors of the medium,
wherein, in the computing step, a spectral radiance of the medium is extracted when an incident wavelength is equal to a measurement wavelength from the bi-spectral radiance factors of the medium, spectral attenuations of color materials used to form the color patches are computed based on the spectral radiance of the medium and the spectral reflectances of the color patches, and the bi-spectral radiance factors of the color patches are computed based on the spectral attenuations of the color materials and the bi-spectral radiance factors of the medium.

6. A non-transitory computer readable medium storing a computer-executable program for causing a computer to perform a color processing method, the method comprising the steps of:
obtaining spectral reflectances of color patches formed on a medium, wherein the spectral reflectances of the color patches are measured under a condition in which light having an excitation wavelength is cut;
inputting bi-spectral radiance factors of the medium on which no color patch is formed, wherein the bi-spectral radiance factors represent spectral radiance factors of the medium in a predetermined wavelength range when monochromatic light is incident on the medium; and
computing bi-spectral radiance factors of the color patches formed on the medium based on the spectral reflectances of the color patches and the bi-spectral radiance factors of the medium,
wherein, in the computing step, a spectral radiance of the medium is extracted when an incident wavelength is equal to a measurement wavelength from the bi-spectral radiance factors of the medium, spectral attenuations of color materials used to form the color patches are computed based on the spectral radiance of the medium and the spectral reflectances of the color patches, and the bi-spectral radiance factors of the color patches are computed based on the spectral attenuations of the color materials and the bi-spectral radiance factors of the medium.

* * * * *